No. 774,082. PATENTED NOV. 1, 1904.
I. KITSEE.
TIME METERING CHARGE FOR TELEPHONE SERVICE.
APPLICATION FILED MAY 17, 1904.
NO MODEL. 3 SHEETS—SHEET 1.

WITNESSES: INVENTOR.

No. 774,082. PATENTED NOV. 1, 1904.
I. KITSEE.
TIME METERING CHARGE FOR TELEPHONE SERVICE.
APPLICATION FILED MAY 17, 1904.
NO MODEL. 3 SHEETS—SHEET 2.

WITNESSES: INVENTOR.

No. 774,082. PATENTED NOV. 1, 1904.
I. KITSEE.
TIME METERING CHARGE FOR TELEPHONE SERVICE.
APPLICATION FILED MAY 17, 1904.
NO MODEL. 3 SHEETS—SHEET 3.

WITNESSES: INVENTOR.

No. 774,082.

Patented November 1, 1904.

UNITED STATES PATENT OFFICE.

ISIDOR KITSEE, OF PHILADELPHIA, PENNSYLVANIA.

TIME METERING CHARGE FOR TELEPHONE SERVICES.

SPECIFICATION forming part of Letters Patent No. 774,082, dated November 1, 1904.

Application filed May 17, 1904. Serial No. 208,491. (No model.)

*To all whom it may concern:*

Be it known that I, ISIDOR KITSEE, of the city and county of Philadelphia, State of Pennsylvania, have invented certain new and useful Improvements in Metering Charges for Telephone Services, (Case No. 188,) of which the following is a specification.

My invention relates to an improvement in metering the charge for telephone service.
Its object is to automatically register at places more or less remote from the place of operation the charge for the time service of an outlying station. In devising an apparatus adapted to automatically register such charge it is necessary to take into consideration that the companies existing to-day have a certain charge rate for the first unit of time and a different charge rate for all additional units of time and also that such companies have one charge rate for day service and another charge rate for night service for one and the same distance.

As in the general practice of to-day the outlying circuits center in one common exchange and are connected therein through a so-called "connecting-cord," a device capable of automatically registering should also take into consideration that only the party calling up is charged with the service, whereas the party called is free from any charge, and in devising such an apparatus I have taken into consideration all these points.

The underlying principle of my invention consists in the employment of what I call "contact-wheels," one or more for each group of charge rates, each group embracing the rate for the first unit of time for day as well as night and the additional units of time for day as well as night. Each wheel therefore embraces four series of contacts, one series representing the charge for the first unit of time for day, one series representing the charge for the first unit of time for night, one series representing the charge for the additional time units for day, and one series representing the charge for the additional time units for night, and for better understanding I have selected as an illustration a contact-wheel adapted to register a local service at the rate of ten cents for the first unit of time by day and six cents for the first unit of time by night and at the rate of six cents for each additional unit of time by day and four cents for each additional unit of time by night, and I have elected that the contacts representing the charge for the first unit of time by day as well as night should be on the face of said wheel, and that the contacts representing the charge for the additional units of time by day shall be on one side, and that the contacts representing the charge for the additional units of time by night shall be on the other side of the wheel.

Referring now to the drawings.

Figures 1, 2, 4:
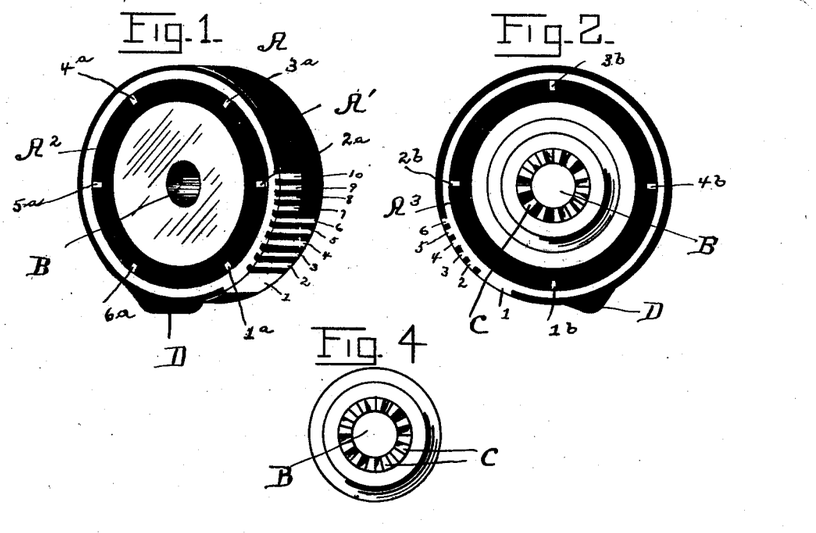
Figure 1 is a perspective view of a contact-wheel.
Fig. 2 is a side elevation of the same.
Fig. 4 is a side elevation of the frictional wheel securely fastened to the shaft and always revolving with same.

A is the contact-wheel as an entirety, of which A' is the face and $A^2$ and $A^3$, respectively, the two sides thereof. The face A is provided with the contacts 1, 2, 3, 4, 5, 6, 7, 8, 9, and 10, the contacts 1 to 6, inclusive, extending the full width of the face and the contacts 7 to 10, inclusive, extending only part of the face of said wheel. On the side $A^2$ of the wheel are the contacts $1^a$, $2^a$, $3^a$, $4^a$, $5^a$, and $6^a$, and on the side $A^3$ of the wheel are the contacts $1^b$, $2^b$, $3^b$, and $4^b$. The wheel is provided with the center hole B and on one side with the corrugations C. The wheel is also provided with the protrudence D and the groove $a$. (Shown in Fig. 5.) In reality the wheel may consist of metal, and the surface may be provided with insulating material on such places where it is desired that the brush shall not come in contact with conducting material. The wheel is mounted on the shaft E in juxtaposition to the friction-wheel F and is pressed with one side against this wheel by the spring G. To counteract this pressure, there is provided the lever H, with the revoluble wedge I. (Shown in position in Fig. 3.) The wheel itself is loosely mounted on the shaft, so that it may either revolve or be kept stationary, no matter if the shaft is revolving or not, as long as this wedge I keeps apart the corrugated surface C from the friction part F. The brush J is designed to make connection with all ten contacts on the face A' of the wheel, and the brush K is designed to make connection with the contacts 1 to 6 on said face during each revolution of said wheel.

In electrical connection with the brush J is the brush J', adapted to make contact with every one of the six contacts on the side $A^2$ of the wheel during each revolution of the same, and the brush K is in electrical contact with the brush K', designed to come in contact with each of the four contacts on the side $A^3$ during each revolution of the wheel.

Figures 3, 5:
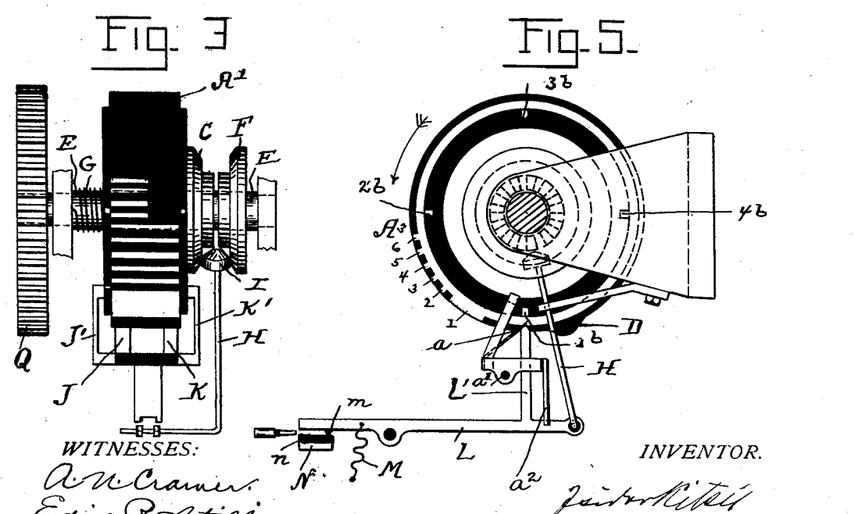
Fig. 3 is an elevation of Fig. 1, showing the manner in which this wheel is mounted on the shaft.
Fig. 5 is a side view of Fig. 3, illustrating the face as well as the side brushes for night.

The lever H is operatively connected, but insulated from the lever L, which lever is held in position, as shown in Fig. 5, by the spring M, so as to rest with the point $m$ on the insulated portion $n$ of the block N.

Figure 6:
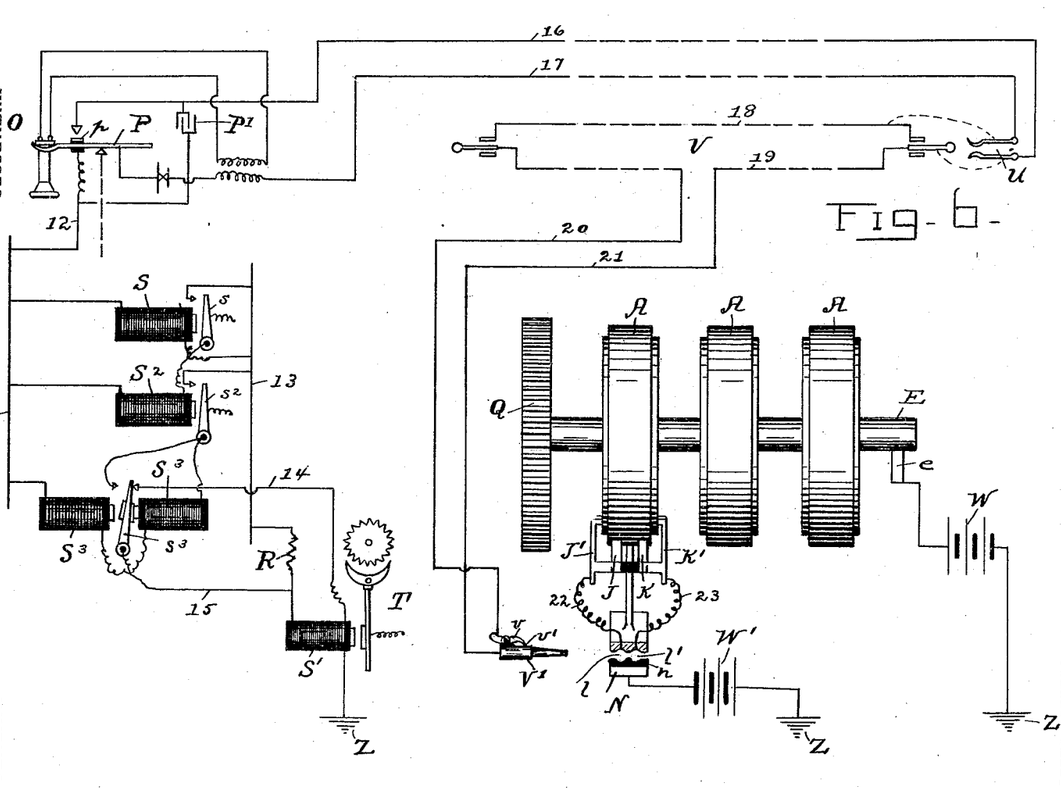
Fig. 6 is a diagrammatic view illustrating the electrical connections of the source of current adapted to actuate the metering device in an outlying station adapted to be connected to a second outlying station through one kind of connecting-cord.

In Fig. 6, O is the outlying station provided with the lever P, which lever is provided with the contact $p$, insulated therefrom, but in electrical contact with wire 12. This wire 12 is in permanent connection, through the coil of electromagnet S, with wire 13, and to this wire 13 is connected, with the interposition of the resistance R, the coil S' of the metering device T. The other terminal of this coil is grounded at Z. To wire 12 is also connected one terminal of the coil of electromagnet $S^2$ and one terminal of the coil of electromagnet $S^3$. The electromagnet S is provided with the armature $s$, adapted to come in contact with the wire 13, thereby establishing a circuit including the coil of electromagnet $S^2$, and the coil of electromagnet $S^2$ is provided with the armature $s^2$, also adapted to make contact with wire 13, thereby establishing a circuit including the two coils of electromagnet $S^3$. These coils are provided with the common armature $s^3$, normally resting against the wire 14, connected to one terminal of the electromagnet S', and the armature itself is connected, through wire 15, with the other terminal of said electromagnet, thereby establishing a shunt around said electromagnet. The outlying station O centers through wires 16 and 17 in the exchange and is connected therein with the interposition of the necessary devices to the different jacks in the switchboards. One of these jacks is here designated at U. The connection of this outlying circuit to a second circuit is made through the insertion of one of the plugs in the circuit calling and through the second of the plugs in the circuit called. These plugs are connected to each other through the connecting-cord. This connecting-cord is here designated as an entirety by the letter V and consists of the wires 18 and 19. The wire 18 may be constructed as usual; but the wire 19 has inserted therein the wires 20 and 21, terminating in the plug V'. This plug consists of the plug proper and the catch $v$, insulated from the plug at the point where it is attached thereto, but normally in contact with the plug through the part $v'$, and being of such construction that this part $v'$ can easily be raised from the plug proper, thereby breaking connection between the wire 20 and 21.

Figure 7:
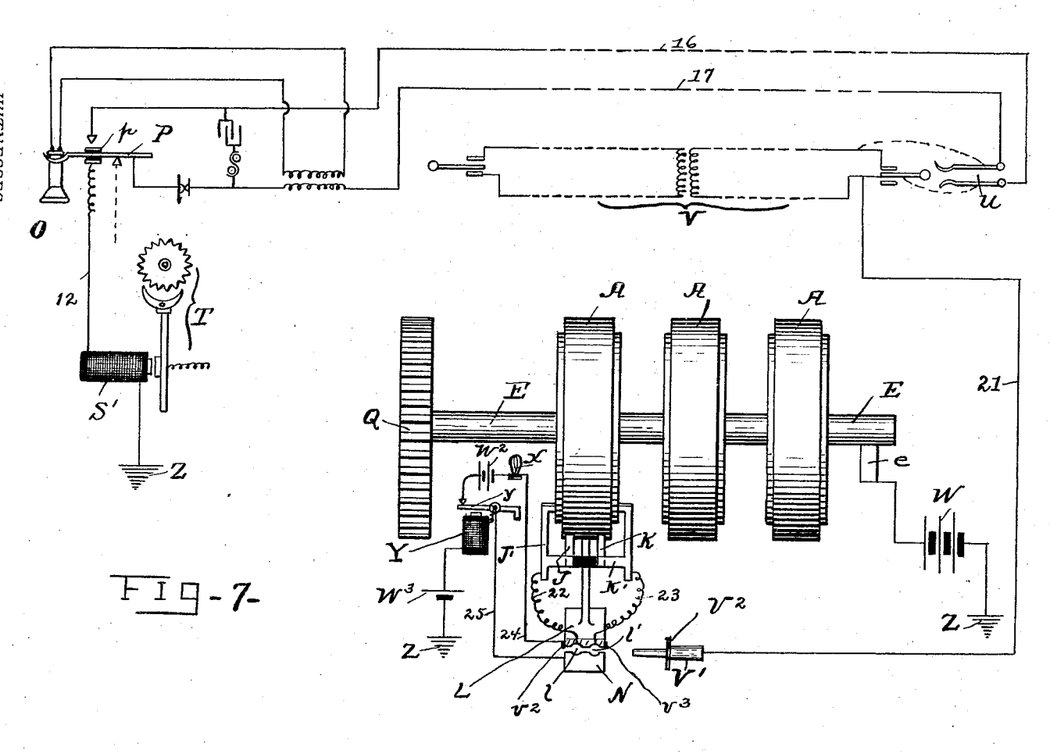
Fig. 7 is a similar view wherein a different connecting-cord is used and wherein means are provided to notify the operator when the conversation has ceased.

The shaft E is in electrical connection, through the brush $e$, with the source of current W, grounded at Z, and the conducting part N is in electrical contact with the source W', grounded at Z. The lever L is provided with the two recesses $l$ and $l'$, adapted to receive the plug V'. The recess $l$ is in electrical connection, through wire 22, with the brushes J and J', and the recess $l'$ is in electrical connection, through wire 23, with the brushes K and K'. In Figs. 6 and 7 the shaft is provided with the three wheels A A A, each wheel to be provided with the necessary contacts to suit requirements, but not shown here.

I will now describe the *modus operandi* of this part of my invention: At the central station, under the care of the operators having in charge a series of outlying stations, is located the contacting device, consisting, broadly, as stated above, of the shaft E, revolved by the suitable means Q. This shaft is designed to make one revolution in a space of time allowed by the company for one charge. It is supposed that the time unit for one charge is three minutes. The shaft therefore has to make every three minutes one revolution. It was also stated above that the contact-wheels are loosely mounted on the shaft, but are provided with means whereby they are closely pressed against the friction-wheel securely mounted on the shaft, and that as long as they are in close contact with the friction-wheel their movement will correspond entirely with the movement of the shaft E, but when the device is out of use the pressure of the spring is counteracted by the revoluble wedge I, attached to the lever H. This wedge is, with the aid of this lever and lever L, pressed in between the contact-wheel proper and the friction device mounted securely on the shaft E. The wheel will still revolve approximately at the same speed as the shaft; but when the wheel is in a position so that the groove $a$ will come opposite to the upright L' the upper part of this upright will fall into this groove, and will thereby estop the wheel from further movement. Thus it will be seen that each wheel will stop at a predetermined position, and this position is such that the brushes J and K will be near the broad contact 1—that is, the first contact to be made for the metering of the charge of a call. Normally, therefore—that is, when the device is entirely out of use—the shaft E will revolve at the usual speed—that is, one revolution every three minutes—but the wheels secured to said shaft will remain stationary. It is now supposed that the subscriber at O has requested to be connected to a second subscriber and that the operator has connected both subscribers through the device V. At the moment of connection the operator places the plug $V^4$, if in day-time, in the recess $l$, and if at night in the recess $l'$, of one or the other of said wheels in accordance with the rate charge for the time unit. It is supposed here that the conversation takes place in the day-time between two subscribers of one city, and it is further supposed that the rate for the first time unit is ten cents and six cents for each additional three minutes. Therefore the plug will be inserted in the recess $l$ of the first wheel A, which has the contacts as outlined in Figs. 1 and 3. Through the insertion of this plug the near end of the lever L will be pressed upward, moving the farther end of the lever L, with its appended lever H and wedge I, downward, thereby removing the means which counteracted the spring G, and as at the same time the upper part of the upright $L'$ will be removed from the groove $a$ it is obvious that the wheel pressed by the spring G against the friction device F will now have to follow the movement of the shaft E. It will be noticed that the separate contacts on the face of the wheel designed to represent the charge of the first time unit are very close to each other and are near the point from where the wheel starts when released from its locking device and that these contacts only occupy a small part of the whole circumference of the wheel, this for the reason that if the subscriber only uses part of the time unit—that is, part of the allotted three minutes—he is still charged with the whole rate—that is, ten cents—and this ten cents must be registered for the shortest possible connection. Through the insertion of the plug $V'$ a circuit will be established between the grounded source of current W at the exchange and the grounded metering device at the subscriber's station O as often as the brush J comes in contact with one or the other of the contacts 1 to 10; but as both the calling subscriber at O and the subscriber called are in electrical connection with each other through the connecting device V, and as each of these subscribers is provided with a metering device the electrical connection between the metering device and the grounded source of current W will be established not only at the station O, but also at the station of the subscriber called, an action desired to be avoided, and for this purpose I have recourse to the following arrangement: As was pointed out in the description of the drawings, the metering device at the subscriber's station is normally inoperative, for the reason that its electromagnet is shunted, and it is necessary first to break this shunt before this metering device could be made operative and that it is necessary to close the circuits of a series of electromagnets before it is possible to open and break this shunt. Now all these operations take a time longer than could be afforded through a very narrow contact-strip, and it will be noticed that the first contact on the face of the wheel is of a width greater even than the width of three or four of the separate contacts following and of a width sufficient so as to continue the flow of the current necessary to fulfil all these operations, and thereby make operative the metering device. The operator by placing the plug $V'$ in the recess $l$ presses against the device $v$ in a manner so as to break the continuity between the part $v'$ and the plug proper. This will break the electrical continuity of the wire 19 of the circuit of the plug V and will allow the first impulse of long duration only to flow over the line 16 of the subscriber O, thereby actuating all the electromagnetic devices and making operative the metering device at this station, but leaving the metering device of the station called in its normal—that is, inoperative—state. The period it takes to perform this operation will easily be ascertained in practice, and the operator has only to keep the device V from connecting electrically with the plug $V'$ till this operation is ended, a period lasting not more than two or three seconds. The time for making the subsequent contacts is of such short duration that it will not suffice to produce the effect of the first broad contact—that is, to make operative that metering device which so far remains inoperative—and all the subsequent impulses will therefore only actuate the metering device of subscriber O. It is true that as soon as the connection with the first broad contact is broken the electromagnets S, $S^2$, and $S^3$ will be deënergized and the armatures of the electromagnets S and $S^2$ will be drawn away from their cores, and therefore from their contacts; but the electromagnet $S^3$ is constructed in a manner so that even if the current ceases the armature will remain in the position into which the first current impulse has forced it, and the shunt, therefore, of the metering device will remain open. In reality the electromagnet $S^3$ consists of the two electromagnetic coils provided with one common polarized armature in a manner so that it requires a reversal of the current to return the armature again to its normal position. It is supposed that the conversation between the two subscribers lasts the full extent of the three minutes. The wheel commencing to revolve in the direction indicated by the arrow in Fig. 5 and revolving at the rate of three minutes for each revolution will near the end of these three minutes be with that part of the circumference opposite the brush J which is provided with the protrudence D, and as soon as the brush J encounters this protrudence it will be thrown upward, and as this brush is operatively connected with the brush J' it is obvious that the brush J' will be lifted to an extent so as to come in contact with that part of the side periphery which is provided with the contacts for the additional time units—that is, the contacts $1^a$ to $6^a$, inclusive. It is now supposed that the conversation continues longer than the allotted three minutes. The brush J, which was lifted by the protrudence D from off the face of the wheel, will remain in this position, as it is frictionally pivoted at $a'$, and it will therefore cease to make connection with any of the contacts on the face of said wheel; but the brush J', which formerly only touched that part of the side of the wheel which was void of any contacts, is now in such a position that it connects during the progress of the movement of said wheel with one or more of the contacts $1^a$ to $6^a$ on the side $A^2$ of said wheel; but, whereas the contacts on the face of the wheel denoting the first time unit are close to each other, for the purpose as stated above, the contacts on the side $A^2$ are distributed around the whole periphery of said side, for the reason that only such part of the additional time unit as is actually consumed by the conversation is charged to the subscriber calling. It is now supposed that after one and one-half minutes over the first time unit the conversation ceases. Therefore the wheel has in all made, first, one full revolution, during which time the brush J made connection with ten contacts, thereby actuating the metering device ten times; second, one-half revolution, during which time the brush J' made connection with one-half of the six contacts distributed at equal distances around the periphery of the side $A^2$—that is, has made connection only with contacts $1^a$, $2^a$, and $3^a$, thereby actuating the metering device three times, making in all thirteen times, and as each actuation registers the value of one cent it is obvious that these thirteen actuations will register the value of thirteen cents, and this is exactly the value charged for four and one-half minutes continuous conversation. It is now supposed that the conversation has ceased and that the operator removes the plug $v'$ from the recess $l$. The lever L will be returned to its position through the action of the spring M, and as the pivoted part of the spring rests, through the upright $a^2$, on the lever L it is obvious that the brushes will again resume their former position. The wheel will be again pressed away from the frictional device F, but will still revolve so long till the groove $a$ comes opposite the upper point of the upright L', when this upper point will fall into the groove $a$, thereby arresting the further action of said wheel; but at the subscriber's station the metering device will still be in an operative position, and it is necessary to make the same inoperative. This I accomplish by sending an impulse of opposite polarity through the grounded leg at the subscriber's station O, and for this reason I have connected to the conducting part N the battery W', grounded also at Z, which battery is oppositely connected from the battery W. The operator after withdrawing the plug V' from the recess $l$ touches the conducting part of N with the point of the plug, thereby transmitting an impulse in opposition to the impulses formerly transmitted, and this impulse of opposite direction will throw the armature $s^3$ again to its normal position—that is, the position as shown in Fig. 6—whereby this armature completes a shunt around the electromagnet of the metering device, thereby making this device inoperative. These, in general, outlines are the operations necessary for metering the exact value of a call made by an outlying subscriber. Should this call be at night instead of in the day-time, then, as above stated, the plug has to be placed in the recess $l'$, which registers the night rate of the first unit, as well as additional time units. In other respects all the operations are the same as if the conversation would take place in the day-time.

In some cases the connecting-plug consists of two parts inductively related to each other, but electrically not connected. In such cases the intermediate devices S, $S^2$, and $S^3$ at the subscriber's station are not necessary; but it would be of great advantage should the operator, through an annunciating device—such, for instance, as the lighting of a lamp—be notified that the conversation has ceased and that the plug now should be removed, and in Fig. 7 I have illustrated this modification. In this figure instead of placing the plug V' in series with the cord of the main plug it is only necessary to connect the plug V' with the cord of the plug V, as is illustrated in this figure, and to place at the subscriber's station only the metering device T, with its electromagnet S', for the reason that it is now unnecessary to guard against the working of the metering device at the station of the subscriber called. In this arrangement it is also unnecessary for the operator to send an impulse over the line in opposition to the impulse adapted to actuate the metering device, and therefore the source of current W' is not required. As stated above, I have illustrated in this figure the means for notifying the operator when the conversation has ceased, and this means consists of a source of current $W^3$, grounded at Z and connected with the other pole to the electromagnetic device Y, provided with the weighted armature $y$, to the pivoting-point of which the second terminal of the electromagnet Y is connected. In proximity to this armature is the terminal of the source of current $W^2$, the other terminal of which is connected to the lamp X, connected, through wire 24, with the point $v^2$ and the point $v^3$ adapted to make contact with the collar $V^2$ of the plug $V'$ if this plug is in position—that is, is inserted in one or the other of the recesses $l$ or $l'$. The armature $y$ is connected, through wire 25, to the conducting-block N. As long as the plug is out of position—that is, is not inserted in either of the recesses—the circuit of the battery $W^2$ is broken, as the terminals of the two wires 24 and 25 are out of electrical contact; but as soon as the plug V is inserted in the recess $l$ or $l'$ the collar $V^2$ connects with one of the points $v^2$ or $v^3$, and as the plug also connects with the conducting-block N it is obvious that the circuit between 24 and 25 is established, thereby making operative the lamp X; but at the same time as the plug V is connected with the leg 16 of the circuit of station O and as the subscriber has, through the removing of his receiver from the hook, connected this leg with the ground Z at his station it is obvious that the path is also established for the source of current $W^3$, and as in the circuit of this battery the electromagnet Y is placed and is therefore energized the armature $y$ will be drawn toward the core and away from the point forming one terminal of the battery $W^2$, thereby breaking the circuit of this battery and making the lamp X again inoperative; but should the subscriber place his receiver on the hook the circuit of the leg 16 with the ground Z will be broken, thereby breaking the circuit of the battery $W^3$ and deënergizing the electromagnet Y, which in turn will result therein that the armature $y$ will return to its position in contact with the terminal of the battery $W^2$, making again a circuit including the lamp X, lighting the same, and this lighting will notify the operator that the conversation has ceased and both the plugs V and $V'$ should be removed from their positions. Through the removal of the plug $V'$ the circuit including the battery $W^2$ will again be broken and the lamp extinguished. The electromagnet Y is of such construction that even a feeble current, such as is generated by one battery, may energize its core to an extent necessary to draw the armature toward the same; but the magnet $S'$ of the metering device T should be of such construction that the feeble current from $W^3$ will not be sufficient to energize it. In other words, the feeble current of $W^3$ should not interfere with the strong impulses of the source of current W or the operation of the device adapted to be actuated through such impulses. It will be noticed that the armature $y$ is minus a spring, but has a counterbalance which may be regulated so as to give this armature the sensitiveness not possessed by the armature of the metering device T. I have not in this figure or in Fig. 6 illustrated the necessary devices at the subscriber's station or the devices necessary to be included in the subscriber or plug circuits, as these do not form part of my invention. It is obvious that should it be desired a metering device may be placed in connection with this system, also at the exchange, so that not only the subscriber, but also the proper officer at the exchange, shall at a glance be able to see the status of telephonic service for this subscriber. If such meter is placed for each subscriber at the exchange, it is best to place all the meters in one room and at one or more metering-boards.

I have in the description of Fig. 6 noted that it is necessary after the conversation has ceased and the subscriber has, through the replacing of his receiver on the hook, broken the contact between wire 16 and wire 12 to send one impulse over the line for the purpose of returning the armature of electromagnet $S^3$ to its normal position, so as to make the electromagnet $S'$ of the metering device T inoperative. As the electrical contact between these two wires is broken, it is necessary to provide means whereby that impulse may flow through the coil of electromagnet $S^3$, and for this reason I have provided the condenser $P'$, shunting the gap between wire 16 and wire 12, and I have constructed the coils of the magnet $S^3$ so that these coils should answer to an impulse of high potential, but short duration. The source $W'$ therefore should be able to charge the condenser $P'$ to an extent so that the discharge of said condenser should be able to actuate the electromagnet $S^3$. In Fig. 7 such impulse is unnecessary, and this condenser $P'$ is therefore omitted in said figure, and I have only in conventional signs illustrated the condenser and bell as now employed in multiple arc between the legs of the subscriber's circuit.

It is obvious that the annunciating device can be employed with the arrangement as illustrated in Fig. 6 as well as with the arrangement shown in Fig. 7.

Having now described my invention, what I claim as new, and desire to secure by Letters Patent, is—

1. In a device of the class described, means for indicating a number of units representing a certain value for the first unit of time, and for indicating a number of units representing certain values for units of time in excess of the first unit of time, said indicating means operating at a different rate per unit for the first unit of time from the rates of the excess time units.

2. In a device of the class described, means for indicating a number of units representing a certain value for the first unit of time, and for indicating a number of units representing certain values for units of time in excess of the first unit of time, said indicating means operating at a different rate per unit for the first unit of time from the rates of the excess time units, and means for automatically rendering said indicating means inoperative after the lapse of a predetermined interval.

3. In a device of the class described, means for indicating a number of units representing the value of telephonic service for the first unit of time, and for indicating a number of units representing certain values of such service for units of time in excess of the first unit of time, said indicating means operating at a different rate per unit for the first unit of time from the rates of the excess time units.

4. In a device of the class described, means for indicating a number of units representing a certain value for the first unit of time for day service, said means also indicating a number of units representing certain values for units of time in excess of the first unit of time for day service, other means for indicating a number of units representing a certain value for the first unit of time for night service but differing in the values represented thereby from the values represented by the means for indicating the day service, said latter means also indicating a number of units representing certain values for units of time in excess of the first unit of time for night service.

5. In a device of the class described, means for indicating a number of units representing a certain value for the first unit of time for day service, said means also indicating a number of units representing certain values for units of time in excess of the first unit of time for day service, other means for indicating a number of units representing a certain value for the first unit of time for night service but differing in the values represented thereby from the values represented by the means for indicating the day service, said latter means also indicating a number of units representing certain values for units of time in excess of the first unit of time for night service, and means for automatically rendering said indicating means inoperative after the lapse of a predetermined interval.

6. In a device of the class described, means to register the value of telephonic service including a plurality of series of contacts representing different charge rates, a register proper, connections between the register proper and said means, whereby the values represented by said contacts are caused to be indicated by said register, and means to actuate said register in accordance with the charge rate for the period of time in which the telephone is used.

7. In a device of the class described, means to register the value of telephonic service including a plurality of contacts divided into different series, each series differing in the number of contacts from the other series and representing charge rates different from the charge rates represented by the other series, a register proper, connections between the register proper and said means, whereby the values represented by said contacts are caused to be indicated by said register, and means to actuate said register in accordance with the charge rate for the period of time in which the telephone is used.

8. In a device of the class described, means to register the value of telephonic service including a plurality of series of contacts representing different charge rates, a register proper, connections between the register proper and said means, whereby the values represented by said contacts are caused to be indicated by said register, and means to automatically actuate said register at a predetermined time unit a number of times for one charge rate differing from the actuation of said register for the other charge rates.

9. In a device of the class described, means to register the value of telephonic service including a shaft, a wheel mounted thereon, a plurality of contacts divided into different series, each series differing in the number of contacts from the other series and representing charge rates differing from the charge rates represented by the other series, a register proper, connections between the register proper and said means, whereby the values represented by said contacts are caused to be indicated by said register, and means to actuate said register in accordance with the charge rate for the period of time in which the telephone is used.

10. In a device of the class described, means to register the value of telephonic service including a plurality of contacts divided into different series, each series differing in the number of contacts from the other series and representing charge rates differing from the charge rates represented by the other series, the series of contacts also indicating the charge rates for day and night service, a register proper, connections between the register proper and said means, whereby the values represented by said contacts are caused to be indicated by said register, and means to actuate said register in accordance with the charge rate for the period of time in which the telephone is used.

11. In a device of the class described, means to register the value of telephonic service including a shaft, a wheel mounted thereon but normally disengaged from the shaft, means for engaging the wheel with the shaft to cause the same rotating therewith, a plurality of series of contacts carried by said wheel, said contacts representing by series different charge rates, a register proper, connections between the register proper and said means, whereby the values represented by said contacts are caused to be indicated by said register, and means to actuate said register in accordance with the charge rate for the period of time in which the telephone is used.

12. In a device of the class described, means to register the value of telephonic service including a shaft, a wheel mounted thereon but normally disengaged from the shaft, means for engaging the wheel with the shaft to cause the same rotating therewith, a plurality of series of contacts carried by said wheel, said contacts representing by series different charge rates, a register proper, connections between the register proper and said means, whereby the values represented by said contacts are caused to be indicated by said register, and means for automatically rendering said wheel inactive.

13. In a device of the class described, means to register the value of telephonic service including a shaft, a plurality of wheels mounted thereon but normally disengaged from the shaft, means for engaging the wheels with the shaft to cause the same rotating therewith, a plurality of series of contacts carried by each of said wheels, said contacts representing by series different charge rates, and the charge rates represented by the contacts of each wheel representing the value of the charge rates for different distances, a register proper, connections between the register proper and said contacts, whereby the values represented by said contacts are caused to be indicated by said register, and means to actuate said register in accordance with the charge rate for the period of time in which the telephone is used.

14. In a device of the class described, means to register the value of telephone service including a shaft, a wheel mounted thereon, a plurality of series of contacts carried by said wheel and representing different charge rates, said contacts being arranged on the periphery and sides of said wheel, the contacts of the periphery of the wheel differing in number from the contacts of the sides thereof, a register proper, connections between the register proper and said contacts, whereby the values represented by said contacts are caused to be indicated by said register, and means to actuate said register in accordance with the charge rate for the period of time in which the telephone is used.

15. In a device of the class described, means to register the value of telephonic service including a shaft, a wheel mounted thereon, a plurality of series of contacts carried by said wheel and representing different charge rates, a contact-brush for each series of contacts, means for actuating said brushes to effect engagement thereof with their respective contacts in accordance with the period of time in which the telephone is in service, a register proper, connections between the register proper and said contacts, whereby the values represented by said contacts are caused to be indicated by said register, and means to actuate said register in accordance with the charge rate for the period of time in which the telephone is used.

16. In a device of the class described, means to register the value of telephonic service including a wheel, a plurality of contacts carried thereby and divided into different series, each series differing in the number of contacts from the other series and representing charge rates differing from the charge rates represented by the other series, a register proper, connections between the register proper and said contacts, whereby the values represented by said contacts are caused to be indicated by said register, and means to actuate said register in accordance with the charge rate for the period of time in which the telephone is used.

17. In a device of the class described, means to register the value of telephonic service including a wheel, a plurality of contacts carried thereby and divided into different series, each series differing in the number of contacts from the other series and representing charge rates differing from the charge rates represented by the other series, a brush for each series of contacts, means for actuating said brushes to effect engagement thereof with their respective contacts in accordance with the period of time in which the telephone is in service, a register proper, connections between the register proper and said contacts, whereby the values represented by said contacts are caused to be indicated by said register, and means to actuate said register in accordance with the charge rate for the period of time in which the telephone is used.

18. A device of the class described embracing a register proper, movable means provided with contacts, stationary contact-brushes for said contacts, means to move said movable means, means independent of said moving means to estop the further progress of said movable means, means to make inoperative said estopping means, and means to actuate said register proper in accordance with the contact of one or the other of said brushes with one or the other of said contacts.

19. In a device of the class described, means to register the value of telephonic service including a wheel, a plurality of contacts carried thereby and divided into different series, each series differing in the number of contacts from the other series and representing charge rates differing from the charge rates represented by the other series, a brush for each series of contacts, means for actuating said brushes to effect engagement thereof with their respective contacts in accordance with the period of time in which the telephone is in service, a register proper, circuit connections between said register proper and said brushes, whereby the values represented by said contacts are caused to be indicated by said register, a source of current included in said circuit connections, and means to actuate said register in accordance with the charge rate for the period of time in which the telephone is used.

20. Means to register the value of service of a telephonic circuit, said means embracing a metering device, a circuit for said metering device, a source of current for said circuit, a contact-wheel provided with more than one series of contacts, each series of contacts denoting a different charge rate, said contacts in electrical connection with said source of current, means to revolve said contact-wheel, thereby transmitting impulses over said circuit of which said metering device forms part.

21. Means to register the value of service of a telephonic circuit, said means including automatic means to make and break a circuit, and means to differentiate said make and break, in accordance with the charge rate to be registered, said circuit including a metering device and means to automatically annunciate when said circuit is broken independently of said automatic means.

22. Means to register the value of service of an outlying telephonic circuit at the subscriber's station, said circuit centering in an exchange, and embracing at said exchange a movable contact-wheel provided with more than one series of contacts, more than one contact-brush in operative relation to said wheel, a plug-circuit, an extension of the plug-circuit, a plug, means to place said plug in electrical connection with one or the other of said brushes, a source of current, said source of current grounded with one pole and in electrical contact through the other pole with the contacts on said wheel, means at the outlying station to ground one leg of said circuit, said means including an electromagnet adapted to actuate a registering device in accordance with the making or breaking of the circuit due to the contacting of one or the other of the contacts on said contact-wheel.

23. In combination with means to register the value of service of a telephonic circuit at a subscriber's station, said circuit centering in an exchange, a grounded circuit at said station including a registering device, electromagnetic means to operate the same, and means at said station to connect one leg of said telephonic circuit to said grounded circuit, means to operate at the exchange said grounded circuit, and means at said exchange to notify the operator as soon as the subscriber of said station, through the replacing of his receiver, has broken the continuity of said grounded circuit from the leg of said telephonic circuit.

24. In a metering device, a register proper and means to normally make said register proper inoperative, said means consisting of a series of electromagnets provided with means to make each other's circuit, and provided with means to nullify said first-mentioned means.

25. In a telephonic system wherein two or more subscribers' stations center in one exchange through their respective circuits, registers proper placed at said subscribers' stations, means to actuate said registers proper placed at the exchange, and means to cause a predetermined impulse or impulses to flow over the circuit of the subscriber calling, said means embracing a plug-circuit and means whereby the circuit of the plug connecting the subscriber calling to the subscriber called is automatically broken.

26. Means to register the value of service of a telephonic circuit embracing a registering device proper and automatic means to actuate said registering device, said registering device and automatic means connected together through an electric circuit, the automatic means embracing two or more series of movable contacts, said movable contacts in electrical connection with one part of said circuit, contact-brushes for said movable contacts, and means to connect the other part of said circuit with said contact-brushes.

27. Means to register the value of service of a telephonic circuit, said means embracing a register proper, means to actuate said register proper, a circuit in which said register proper is inserted, a plug-circuit adapted to be connected to said circuit, means operatively related to said plug-circuit to electrically connect said register proper with said actuating means and means to annunciate the condition of the circuit to be metered.

28. Means to register automatically the value of service of a telephonic circuit, said means embracing two or more movable contact means, each provided with series of contacts denoting a different charge rate, stationary brushes for said movable contact means, means to cause said movable means to stop at a predetermined position, means to cause said contact means to move as soon as the circuit connecting said means with the registering device proper is established, and means to cause the movement of said movable contact means to cease after said circuit has been broken independently of the breaking of said circuit through said brushes, and said contact means has assumed a predetermined position.

29. In a device of the class described, means for indicating a number of units representing a certain value for the first unit of time for day service, said means also indicating a number of units representing certain values for units of time in excess of the first unit of time for day service, other means for indicating a number of units representing a certain value for the first unit of time for night service but differing in the values represented thereby from the values represented by the means for indicating the day service, said latter means also indicating a number of units representing certain values for units of the time in excess of the first unit of time for night service, and means for bringing to rest the indicating devices when the use of the telephone has been discontinued.

30. In a device of the class described, means for indicating a number of units representing a certain value for the first unit of time for day service, said means also indicating a number of units representing certain values for units of time in excess of the first unit of time for day service, other means for indicating a number of units representing a certain value for the first unit of time for night service but differing in the values represented thereby from the values represented by the means for indicating the day service, said latter means also indicating a number of units representing certain values for units of time in excess of the first unit of time for night service, means for bringing to rest the indicating devices when the use of the telephone has been discontinued, and means for also restoring said indicating devices to their initial position when coming to rest.

31. A device to automatically register for telephonic service of the first as well as additional time units embracing the register proper and means to actuate said register, said means embracing a revoluble wheel provided with two sets of contacts, one set of contacts arranged in a manner on said wheel so that part of one revolution of said wheel will make active all of the contacts of said set, and the second set of contacts arranged on said wheel in a manner so that a whole revolution of same is necessary to make active all of the contacts of said second set.

32. As a means to automatically register the different charge rates of the first and additional time units of one continuous telephonic service, a register proper and means to actuate said register, said means provided with two sets of contacts, one set occupying a greater space than the second set, and means to make operative first one and after a predetermined time the second of said sets.

In testimony whereof I hereby sign my name, in the presence of two subscribing witnesses, this 16th day of May, A. D. 1904.

ISIDOR KITSEE

Witnesses:
    EDITH R. STILLEY,
    H. C. YETTER.